(12) United States Patent
Lao et al.

(10) Patent No.: US 9,686,336 B2
(45) Date of Patent: Jun. 20, 2017

(54) COMMUNICATING APPARATUS

(71) Applicant: Realtek Semiconductor Corp., HsinChu (TW)

(72) Inventors: Heng Cheong Lao, Hsinchu (TW); Ta-Chin Tseng, New Taipei (TW); Chih-Chi Wang, Taichung (TW); Liang-Wei Huang, Hsinchu (TW)

(73) Assignee: Realtek Semiconductor Corp., HsinChu (TW)

( * ) Notice: Subject to any disclaimer, the term of this patent is extended or adjusted under 35 U.S.C. 154(b) by 163 days.

(21) Appl. No.: 14/325,338

(22) Filed: Jul. 7, 2014

(65) Prior Publication Data
US 2015/0016474 A1  Jan. 15, 2015

(30) Foreign Application Priority Data

Jul. 15, 2013  (TW) .............................. 102125257 A

(51) Int. Cl.
*H04L 29/06* (2006.01)
*H04L 29/08* (2006.01)

(52) U.S. Cl.
CPC .......... *H04L 65/601* (2013.01); *H04L 65/602* (2013.01); *H04L 65/607* (2013.01); *H04L 67/12* (2013.01); *H04L 69/04* (2013.01)

(58) Field of Classification Search
CPC ............................. H04L 65/601; H04L 69/04
See application file for complete search history.

(56) References Cited

U.S. PATENT DOCUMENTS

| | | | |
|---|---|---|---|
| 6,363,432 B1 | 3/2002 | Laber | |
| 7,212,872 B1* | 5/2007 | Smith | ........................ H04S 3/00 381/27 |
| 7,720,068 B2 | 5/2010 | McClellan | |
| 8,693,697 B2* | 4/2014 | Van Dongen | ......... G10L 19/008 381/17 |
| 2004/0202205 A1* | 10/2004 | Sheth | ........................ H04J 3/04 370/539 |
| 2006/0218302 A1* | 9/2006 | Chia | ....................... H04L 47/10 709/245 |
| 2007/0061631 A1* | 3/2007 | Nakamura | .......... H04L 12/2697 714/43 |

(Continued)

FOREIGN PATENT DOCUMENTS

CN  101567778 A  10/2009

OTHER PUBLICATIONS

J. Sommer, S. Gunreben, F. Feller, M. Köhn, A. Mifdaoui, D. Saβ, and J. Scharf, "Ethernet—A survey on its fields of application", IEEE Communications Surveys & Tutorials, vol. 12, No. 2, second quarter 2010, pp. 263-284, 2010 IEEE.

*Primary Examiner* — Michael Thier
*Assistant Examiner* — Brian Cox
(74) *Attorney, Agent, or Firm* — Winston Hsu

(57) ABSTRACT

A communicating apparatus comprising a receiving module which comprises: a first receiving line, for receiving a second input data stream; a timing detecting apparatus, for detecting timings for a plurality of data units of the second input data stream; a data allocating apparatus, for allocating the second input data stream to X allocated data streams, wherein the X is a positive integer and the X is larger or equals to 2; and X second receiving lines, for respectively transmitting one of the X allocated data streams.

9 Claims, 10 Drawing Sheets

(56) References Cited

U.S. PATENT DOCUMENTS

2009/0081947 A1* 3/2009 Margis ............... H04B 7/18508
455/3.02
2015/0067749 A1* 3/2015 Huber .................. H04L 65/607
725/110

* cited by examiner

COMMUNICATING APPARATUS

BACKGROUND OF THE INVENTION

1. Field of the Invention

The present invention relates to a communicating apparatus, and particularly relates to a communicating apparatus that can match transmitting setting for a communicating apparatus with a plurality of transmitting lines.

2. Description of the Prior Art

FIG. 1 is a schematic diagram illustrating a conventional automotive network apparatus 100. As shown in FIG. 1, the host apparatus 101 transmits data to the transmitting module $TM_1$ in the transceiving circuit $T_{r1}$ via 4 transmitting lines while transmitting data, and then transmits data to the analog front end $AFE_2$ via the analog front end $AFE_1$. After that, the receiving module $RM_2$ in the transceiving circuit $T_{r2}$ receives data from the analog front end $AFE_2$ to the slave apparatus 103. The slave apparatus 103 transmits data to the transmitting module $TM_2$ in the transceiving circuit $T_{r2}$ via 4 transmitting lines while receiving data, and then transmits data to the analog front end $AFE_1$ via the analog front end $AFE_2$. After that, the receiving module $RM_1$ in the transceiving circuit $T_{r1}$ receives data from the analog front end $AFE_1$ to the host apparatus 101.

In view of above-mentioned embodiment, it can be understood that the conventional automotive network apparatus is designed to operate for four pair of transmitting lines. Also, the automotive network apparatus has a strict standard for data receiving speed, data transmitting speed, data amount that are encrypted/decrypted in a predetermined time period. Therefore, if the automotive network apparatus is desired to a number of transmitting lines other than 4 pairs, setting for all devices must be largely changed, such that the inconvenience for design is caused.

SUMMARY OF THE INVENTION

One embodiment of the present invention discloses a transmitting module according to the present invention can be summarized as: a transmitting module, comprising: M first transmitting lines, for respectively transmitting one of M first input data streams; a data integrating apparatus, for receiving the M first input data streams transmitted by the M first transmitting lines, and for integrating the M first input data streams to N integrated data streams, wherein M and N are positive integers and the M is larger than the N; and N second transmitting lines, for transmitting one of the N integrated data streams.

Another embodiment of the present invention discloses a communicating apparatus comprising a receiving module which comprises: a first receiving line, for receiving a second input data stream; a timing detecting apparatus, for detecting timings for a plurality of data units of the second input data stream; a data allocating apparatus, for allocating the second input data stream to X allocated data streams, wherein the X is a positive integer and the X is larger or equals to 2; and X second receiving lines, for respectively transmitting one of the X allocated data streams.

Additionally, another embodiment of the present invention discloses a receiving module comprising: X first receiving lines, for respectively receiving one of X second input data streams; a data allocating apparatus, for locating the X second input data streams to Y allocated data streams, wherein the X and the Y are both positive integers, where the X is larger or equals to 2 and the Y is larger than the X; a timing aligning apparatus, for detecting timings for Y allocated data streams, thereby timings of the Y allocated data streams can align to each other; Y second receiving lines, for respectively transmitting one of the Y allocated data streams. Please note the transmitting module and the receiving module provided by the present invention can independently operate.

In one embodiment, the timing detecting apparatus comprising a plurality of timing detecting circuits for respectively using different detecting standards to detect timings for the symbols of the second input data stream.

In view of above-mentioned embodiments, a communicating apparatus with less pairs of transmitting lines can match a transmitting mechanism for a communicating apparatus with more pairs of transmitting lines without greatly varying encoding/decoding algorithms. Also, a timing detecting apparatus that can rapidly detect symbol timings is also provided.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
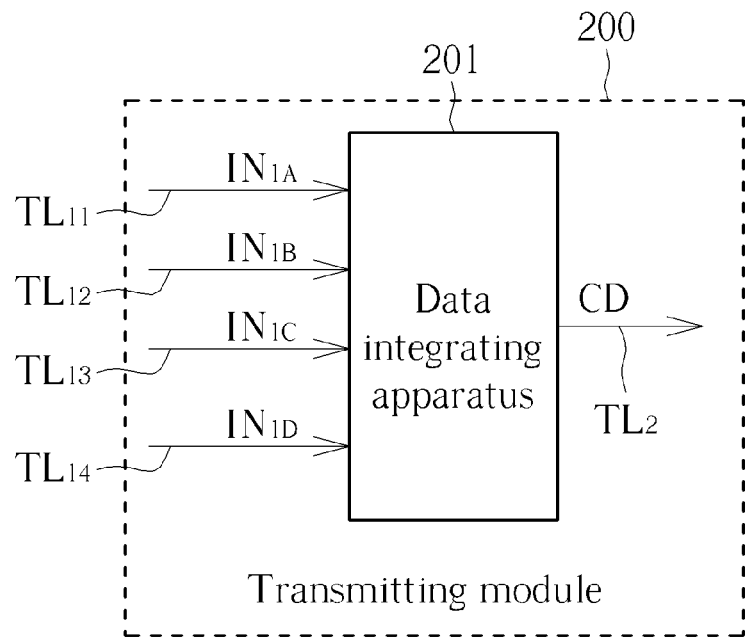
FIG. 2 is a block diagram illustrating a transmitting module according to one embodiment of the present invention.

The concept of the present invention will be described via a plurality of diagrams. An automotive network apparatus is utilized as an example for explaining, but the idea disclosed by the present invention can be applied to other communicating apparatuses. FIG. 2 is a block diagram illustrating a transmitting module according to one embodiment of the present invention. As shown in FIG. 2, the transmitting module 200 comprises 4 first transmitting lines $TL_{11}$-$TL_{14}$, for respectively transmitting one of 4 first input data streams $IN_{1A}$-$IN_{1D}$. The data integrating apparatus 201 receives the 4 first input data streams $IN_{1A}$-$IN_{1D}$ transmitted by the first transmitting lines $TL_{11}$-$TL_{14}$, and integrates the first input data streams $IN_{1A}$-$IN_{1D}$ to an integrated data stream CD. The transmitting module 200 further comprises a second transmitting line, for transmitting the integrated data stream CD.

Figure 3:
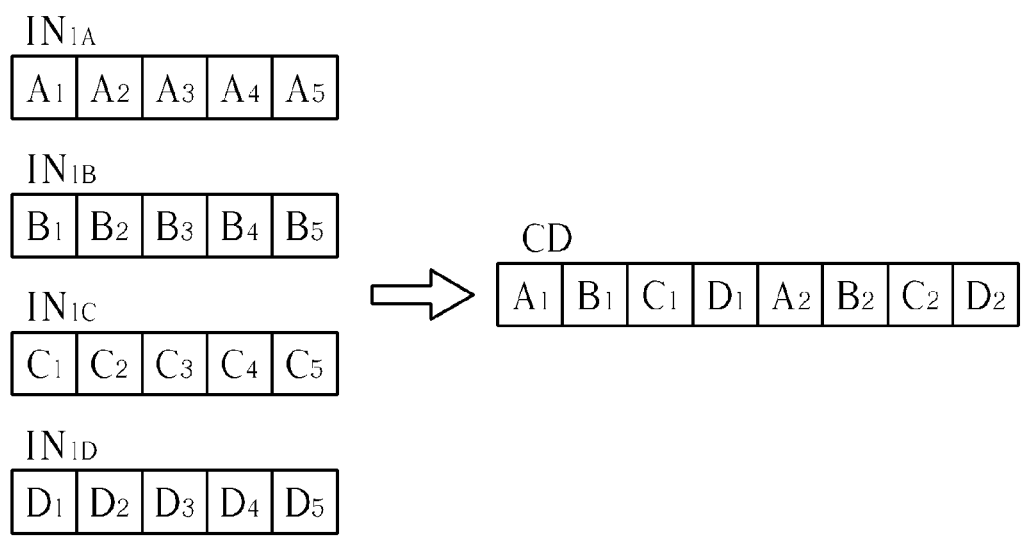
FIG. 3 is a schematic diagram illustrating the operation for the transmitting module shown in FIG. 2.

FIG. 3 is a schematic diagram illustrating the operation for the transmitting module shown in FIG. 2. As shown in FIG. 3, the first input data streams $IN_{1A}$-$IN_{1D}$ respectively comprises symbols $A_1$-$A_5$, $B_1$-$B_5$, $C_1$-$C_5$, $D_1$-$D_5$. The symbols can be replaced with other data units. The data integrating apparatus 201 integrates the data to be the integrated data stream CD and transmits it on a single second transmitting line $TL_2$. Therefore, the integrated data stream CD sequentially comprises symbols $A_1$, $B_1$, $C_1$, $D_1$. . . . Please note the integrated data stream CD is only for illustrating that it comprises the symbols for the first input data streams $IN_{1A}$-$IN_{1D}$, but it does not mean that the arrangement for the symbols is limited to which shown in FIG. 3.

Figure 4:
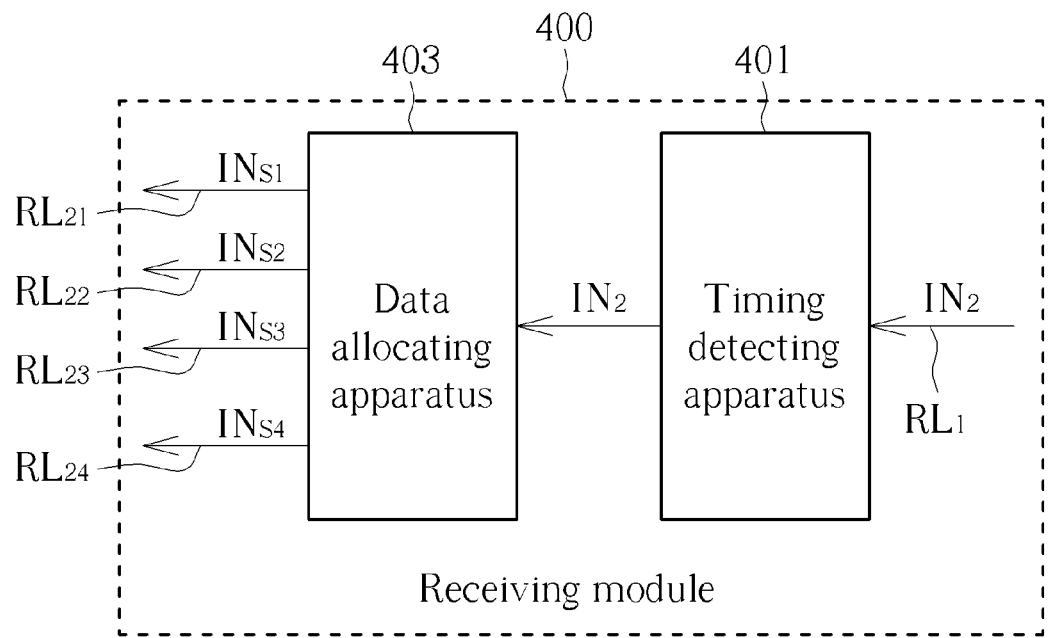
FIG. 4 is a block diagram illustrating a receiving module according to one embodiment of the present invention.

FIG. 4 is a block diagram illustrating a receiving module 400 according to one embodiment of the present invention. As shown in FIG. 4, the receiving module 400 comprises a first receiving line $RL_1$, a timing detecting apparatus 401, a data allocating apparatus 403, and 4 second receiving lines $RL_{21}$, $RL_{22}$, $RL_{23}$, $RL_{24}$. The first receiving line $RL_1$ receives a second input data stream $IN_2$. The timing detecting apparatus 401 detects timings for symbols of the second input data stream $IN_2$. Many methods can be applied to implement the timing detecting apparatus 401. For example, control the symbol to have timing information when it is generated. Alternatively, give the symbol timing information according the timing that the symbols are received while receiving the symbols. The data allocating apparatus 403 allocates the second input data stream $IN_2$ to 4 allocated data streams $I_{NS1}'I_{NS2}'I_{NS3}'I_{NS4}$ according to the timings detected by the timing detecting apparatus 401. The second receiving lines $RL_{21}$, $RL_{22}$, $RL_{23}$, $RL_{24}$ respectively transmit one of the allocated data streams $I_{NS1}'I_{NS2}'I_{NS3}'I_{NS4}$.

Figure 5:
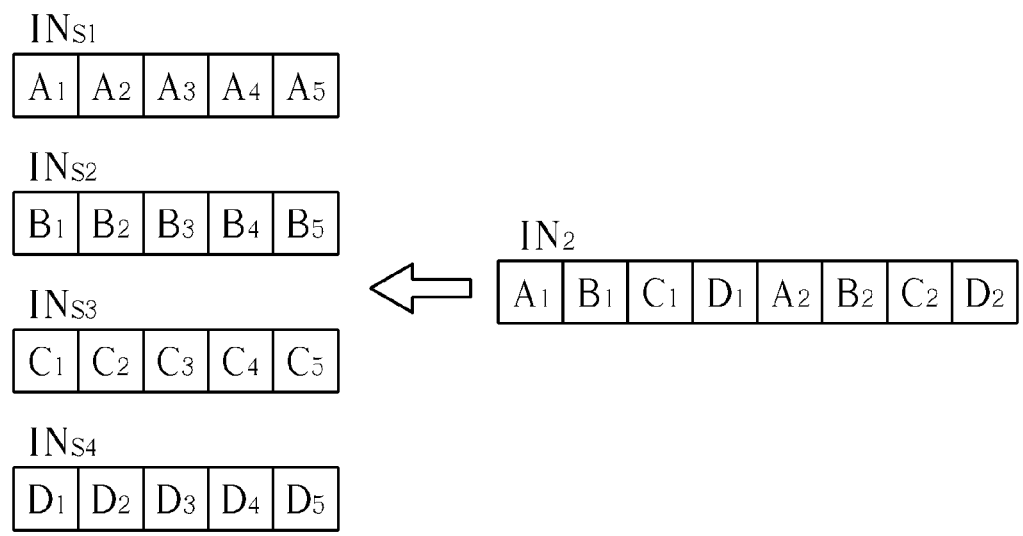
FIG. 5 is a schematic diagram illustrating the operation for the receiving module shown in FIG. 4.

FIG. 5 is a schematic diagram illustrating the operation for the receiving module shown in FIG. 4.1 As shown in FIG. 5, the second input data stream $IN_2$ sequentially comprises symbols $A_1$, $B_1$, $C_1$, $D_1$, and the allocated data streams $IN_{S1}$, $IN_{S2}$, $IN_{S3}$, $IN_{S4}$ respectively comprises symbols $A_1$-$A_5$, $B_1$-$B_5$, $C_1$-$C_5$, $D_1$-$D_5$. Via such method, the symbols mixed in the second input data stream $IN_2$ can be allocated to corresponding second receiving lines. Please note the symbol types and orders for the second input data stream $IN_2$, and the symbol corresponding relations for the second input data stream $IN_2$ and the allocated data streams $I_{NS1}'I_{NS2}'I_{NS3}'I_{NS4}$ are not limited to the arrangement shown in the embodiment of FIG. 5. The symbols can be arranged according to different requirements.

Figure 6:
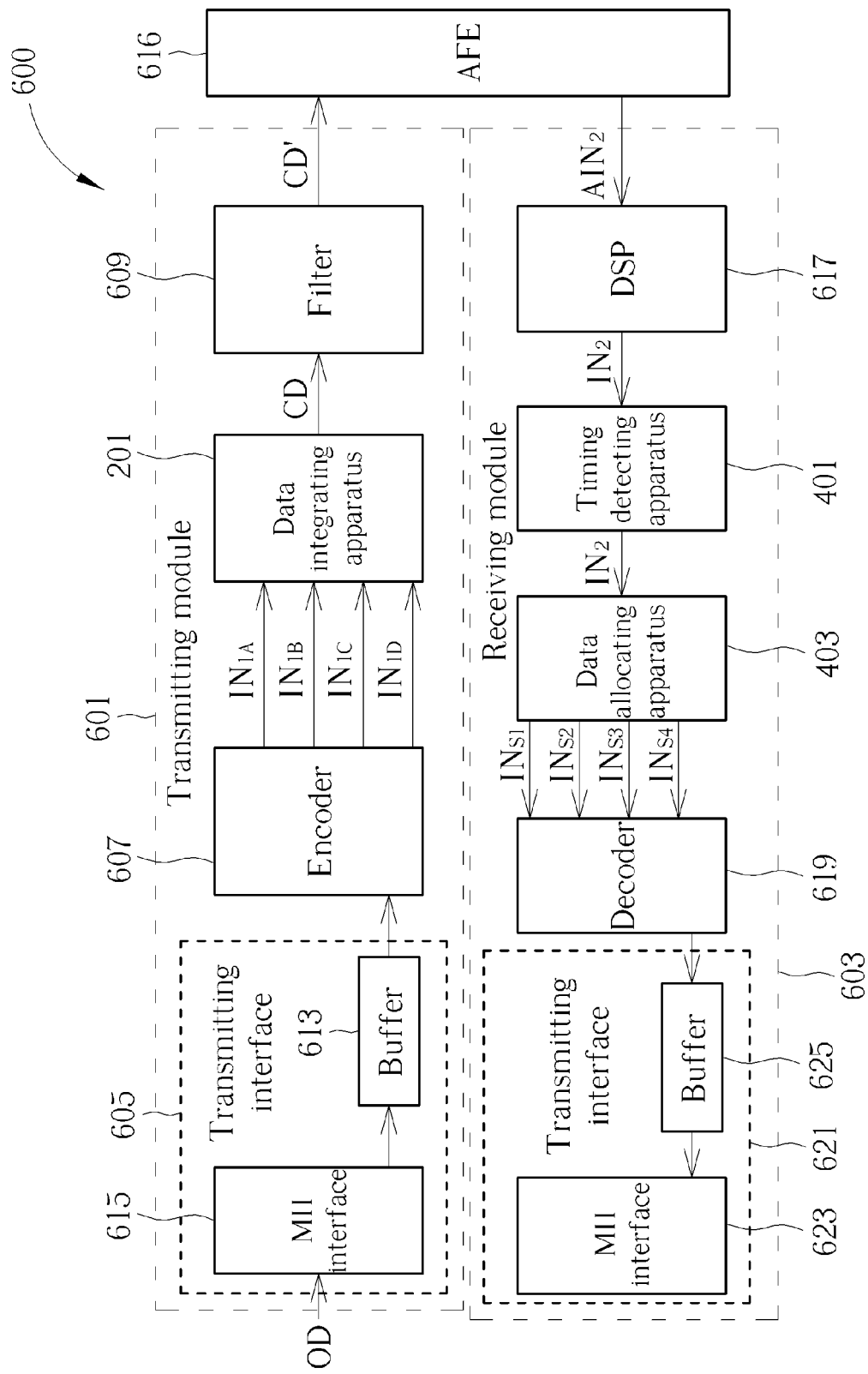
FIG. 6 is a block diagram illustrating an automotive network apparatus comprising the transmitting module in FIG. 2 and the receiving module in FIG. 4.

FIG. 6 is a block diagram illustrating an automotive network apparatus 600 comprising the transmitting module in FIG. 2 and the receiving module in FIG. 4. Please note some device numbers for the transmitting module in FIG. 2 and the receiving module in FIG. 4 are not illustrated in FIG. 6 for diagram simplifying. As shown in FIG. 6, the automotive network apparatus 600 comprises a transmitting module 601 and a receiving module 603. The transmitting module 601 further comprises the transmitting interface 605, the encoder 607 and the filter 609 besides the data integrating apparatus 201 shown in FIG. 2. The transmitting interface 605 receives and registers an original data stream OD. The transmitting interface 605 transmits the registered original data stream to the encoder 607 if data amount for the registered original data exceeds a predetermined data amount. The encoder 607 encodes the received original data stream OD to the first input data stream $IN_{1A}$-$IN_{1D}$. In one embodiment, the transmitting interface 605 comprises a MII (Media Independent Interface) 615 for receiving the original data stream OD, and comprises a buffer 613 for registering the original data stream OD processed by the MII 615. In one embodiment, the MII 615 meets the standard for IEEE Std., which has a speed for 25 MHz. The encoder 607 encodes via a speed of 12.5 MHz. Therefore, for matching the speed for the encoder 607, the buffer 613 (a Nibble to Byte buffer in this example) accumulates data transmitted by the MII from TXD[3:0] to TXD[7:0], and then transmits to the encoder 607 for encoding. The encoder 607 follows a physical coding sublayer encoding code rule matching 1000 BASE-T standard. The first input data stream $IN_{1A}$-$IN_{1D}$ encoded by the encoder 607 is transmitted to the data integrating apparatus 201, and the integrated data stream CD is generated as shown in FIG. 2. In one embodiment, the integrated data stream CD is transmitted to the filter 609 such that a filtered data stream CD' is generated, and then the filtered data stream CD' is transmitted to the AFE 616 to be output.

The receiving module 603 comprises a timing detecting apparatus 401, a data allocating apparatus 403, a digital signal processing apparatus 617, a decoder 619 and a transmitting interface 621. The digital signal processing apparatus 617 converts the analog second input data stream $AIN_2$ to the second input data stream $IN_2$. The operations for the timing detecting apparatus 401 and the data allocating apparatus 403 are already described as above-mentioned, thus are omitted for brevity here. The decoder 619 follows a physical coding sublayer decoding code rule matching 1000 BASE-T standard. In one embodiment, the transmitting interface 621 comprises a MII 623 and a buffer 625. The buffer 625 receives the allocated data stream processed by the decoder 619, and registers the processed allocated data stream until the data amount reaches a predetermined data amount. After that, the MII 623 outputs the registered allocated data stream. In one embodiment, the buffer 625 is a Byte to Nibble buffer, which registers the registered allocated data stream until it reaches the data amount RXD [3:0].

Figure 7:
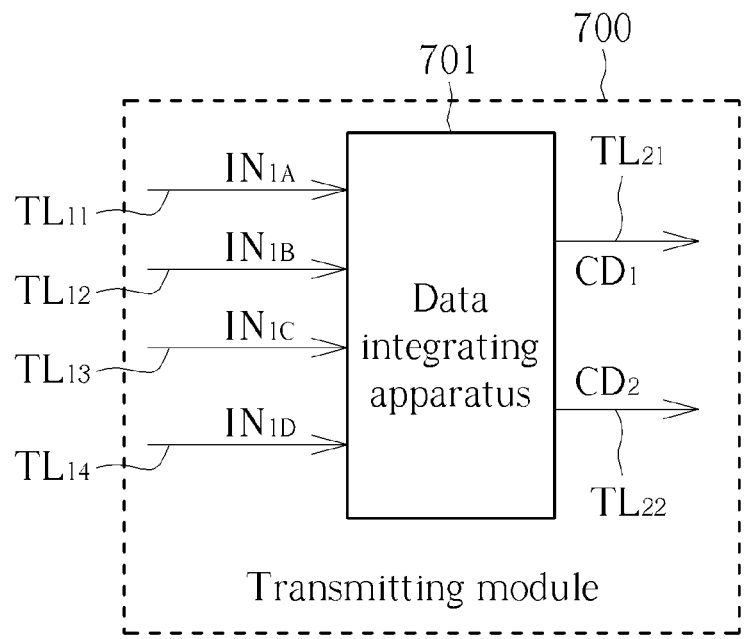
FIG. 7 is a block diagram illustrating a transmitting module according to another embodiment of the present invention.

FIG. 7 is a block diagram illustrating a transmitting module 700 according to another embodiment of the present invention. The transmitting module 700 also comprises a data integrating apparatus 401, and 4 first transmitting lines $TL_{11}$-$TL_{14}$ for respectively transmitting one of the 4 first input data streams $IN_{1A}$-$IN_{1D}$. However, the transmitting module 700 comprises 2 second transmitting lines $TL_{21}$, $TL_{22}$ rather than the one second transmitting line in FIG. 2. Therefore, the data integrating apparatus 401 integrate the first input data streams $IN_{1A}$-$IN_{1D}$ to two integrated data streams $CD_1$, $CD_2$.

Figure 8:
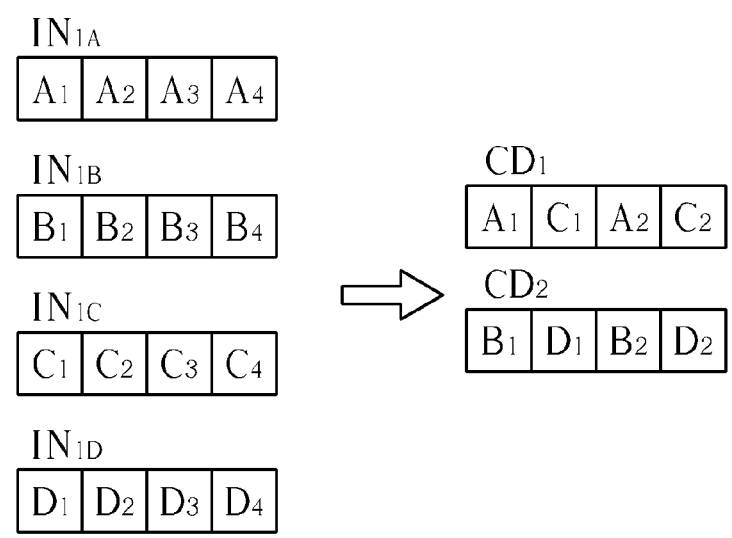
FIG. 8 and FIG. 9 are schematic diagrams illustrating the operation for the transmitting module shown in FIG. 7.
Figure 9:
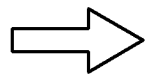

There are many forms for the relations between the symbols comprised in the integrated data streams $CD_1$, $CD_2$ and the symbols comprised in the first input data streams $IN_{1A}$-$IN_{1D}$. FIG. 8 and FIG. 9 are two examples of them. In the example of FIG. 8, the first input data streams $IN_{1A}$-$IN_{1D}$ respectively comprise the symbols $A_1$-$A_4$, $B_1$-$B_4$, $C_1$-$C_4$, $D_1$-$D_4$. The integrated data streams $CD_1$ comprises symbols $A_1$, $C_1$, $A_2$, $C_2$ sequentially, and the integrated data streams $CD_2$ comprises symbols $B_1$, $D_1$, $B_2$, $D_2$ sequentially, that is, matching the following Equation (1):

$$CD_1 = \begin{cases} IN_{1A} & \text{if } n \text{ is even} \\ IN_{1C} & \text{else} \end{cases} \quad \text{Equation (1)}$$

$$CD_2 = \begin{cases} IN_{1B} & \text{if } n \text{ is even} \\ IN_{1D} & \text{else} \end{cases}$$

In the example of FIG. 9, the first input data streams $IN_{1A}$-$IN_{1D}$ respectively comprise the symbols $A_1$-$A_4$, $B_1$-$B_4$, $C_1$-$C_4$, $D_1$-$D_4$. The integrated data streams $CD_1$ comprises symbols $A_1$, $B_1$, $A_2$, $B_2$ sequentially, and the integrated data streams $CD_2$ comprises symbols $C_1$, $D_1$, $C_2$, $D_2$ sequentially, that is, matching the following Equation (2):

$$CD_1 = \begin{cases} IN_{1A} & \text{if } n \text{ is even} \\ IN_{1B} & \text{else} \end{cases} \quad \text{Equation (2)}$$

$$CD_2 = \begin{cases} IN_{1C} & \text{if } n \text{ is even} \\ IN_{1D} & \text{else} \end{cases}$$

In view above-mentioned equations, it can be understood the symbols comprised in the integrated data streams $CD_1$, $CD_2$ and the symbols comprised in the first input data streams $IN_{1A}$-$IN_{1D}$ can be changed to any arrangement according to the requirement.

Figure 10:
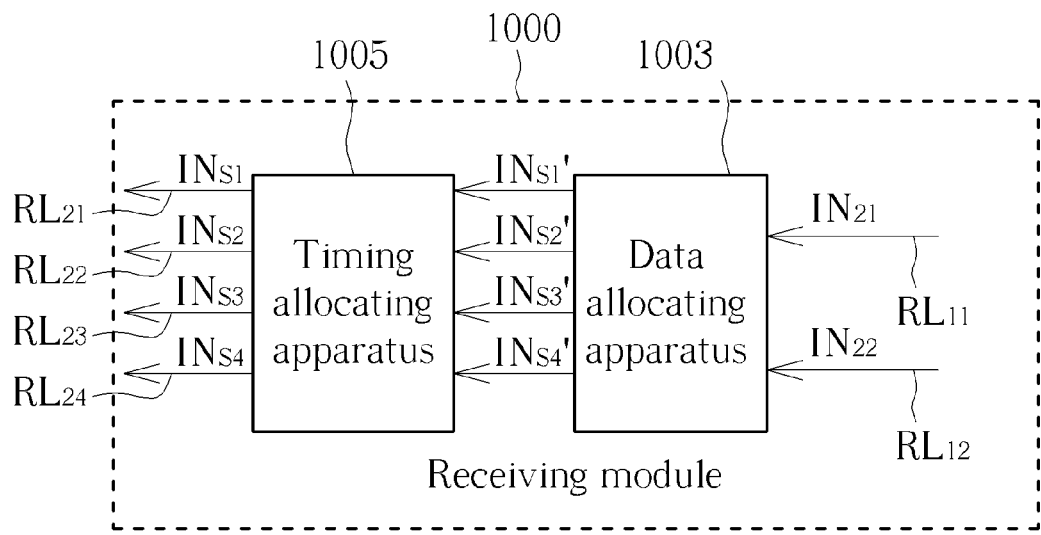
FIG. 10 is a block diagram illustrating a receiving module according to another embodiment of the present invention.

FIG. 10 is a block diagram illustrating a receiving module 1000 according to another embodiment of the present invention. The receiving module 1000 also comprises a timing detecting apparatus 1001, a data allocating apparatus 1003 and 4 second receiving lines $RL_{21}$, $RL_{22}$, $RL_{23}$ and $RL_{24}$, the same as the receiving module 400 in FIG. 4. However, the receiving module 1000 comprises 2 first receiving limes $RL_{11}$, $R_{12}$, thus receive two second input data streams $IN_{21}$, $IN_{22}$. The data allocating apparatus 1003 allocating the second input data streams $IN_{21}$, $IN_{22}$ to generate allocated input data streams $IN_{S1}'$, $IN_{S2}'$, $IN_{S3}'$, $IN_{S4}'$ before timing adjusting. In one embodiment, the receiving module 1000 further comprises a timing aligning apparatus 1005 for detecting and adjusting timings for allocated data streams $IN_{S1}'$, $IN_{S2}'$, $IN_{S3}'$, $IN_{S4}'$, thereby timings of the allocated data streams $IN_{S1}'$, $IN_{S2}'$, $IN_{S3}'$, $IN_{S4}'$ can align to each other to generate allocated data streams $IN_{S1}$, $IN_{S2}$, $IN_{S3}$, $IN_{S4}$. That is, the data allocating apparatus allocates the second input data streams $IN_{21}$, $IN_{22}$ to different channels according to the recorded symbols for the second input data streams $IN_{21}$, $IN_{22}$, and the timing aligning apparatus 1005 aligns timings for the symbols. Please note that the data allocating apparatus 1003 and the timing aligning apparatus 1005 can be two independent circuits but can also be incorporated to a single circuit.

Figure 11:
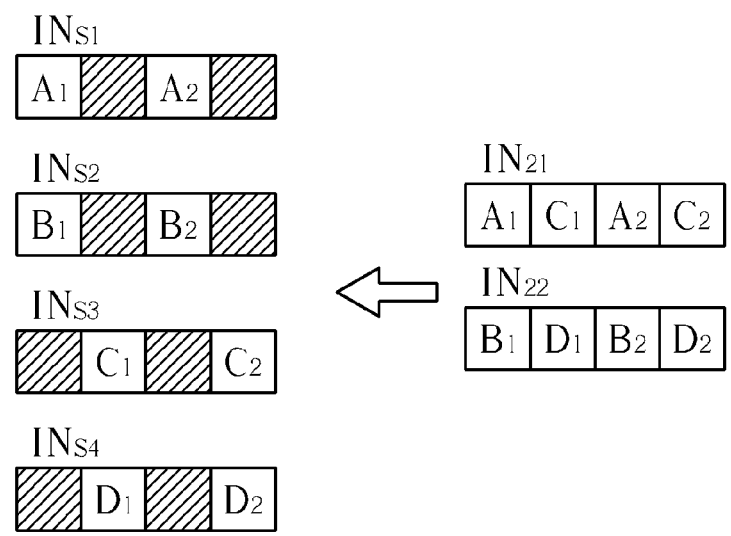
FIG. 11 and FIG. 12 are schematic diagrams illustrating the operation for the receiving module shown in FIG. 10.
Figure 12:
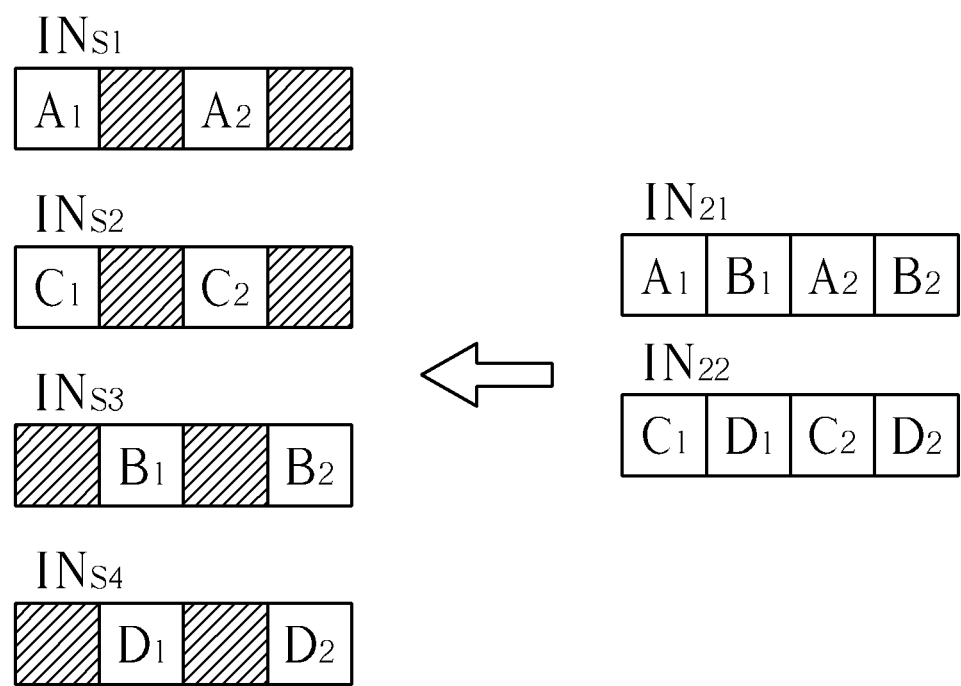

There are many forms for the relations between the symbols comprised in the second input data streams $IN_{21}$, $IN_{22}$ and the symbols comprised in the allocated data streams $IN_{S1}$, $IN_{S2}$, $IN_{S3}$, $IN_{S4}$. FIG. 11 and FIG. 12 are two examples of them. FIG. 11 corresponds to the example in FIG. 8, the second input data stream $IN_{21}$ sequentially comprises the symbols $A_1$, $C_1$, $A_2$, $C_2$. . . , and the second input data stream $IN_{22}$ sequentially comprises the symbols $B_1$, $D_1$, $B_2$, $D_2$. . . . In one embodiment, the data allocating apparatus 1003 allocates symbols in the second input data stream $IN_{21}$ and the second input data stream $IN_{22}$ via the Equation (3):

$$IN_{S1} = \begin{cases} IN_{21} & \text{if } n \text{ is even} \\ IN_{S1} & \text{else} \end{cases} \quad \text{Equation (3)}$$

$$IN_{S2} = \begin{cases} IN_{22} & \text{if } n \text{ is even} \\ IN_{S2} & \text{else} \end{cases}$$

$$IN_{S3} = \begin{cases} IN_{21} & \text{if } n \text{ is odd} \\ IN_{S3} & \text{else} \end{cases}$$

$$IN_{S4} = \begin{cases} IN_{22} & \text{if } n \text{ is odd} \\ IN_{S4} & \text{else} \end{cases}$$

By this way, a schematic diagram in FIG. 11 is formed, wherein the symbol marked by oblique lines indicated blank symbols.

FIG. 12 corresponding to the example shown in FIG. 9, the second input data stream $IN_{21}$ sequentially comprises symbols $A_1$, $B_1$, $A_2$, $B_2$, and the second input data stream $IN_{22}$ sequentially comprises symbols $C_1$, $D_1$, $C_2$, $D_2$. In one embodiment, the above-mentioned equation (3) is still utilized to allocate the symbols for the second input data streams $IN_{21}$, $IN_{22}$. However, the allocated data streams $IN_{S1}$, $IN_{S2}$, $IN_{S3}$, $IN_{S4}$ have symbols different from which in FIG. 11 since the second input data streams $IN_{21}$, $IN_{22}$ have symbols different from which in FIG. 11.

Figure 13:
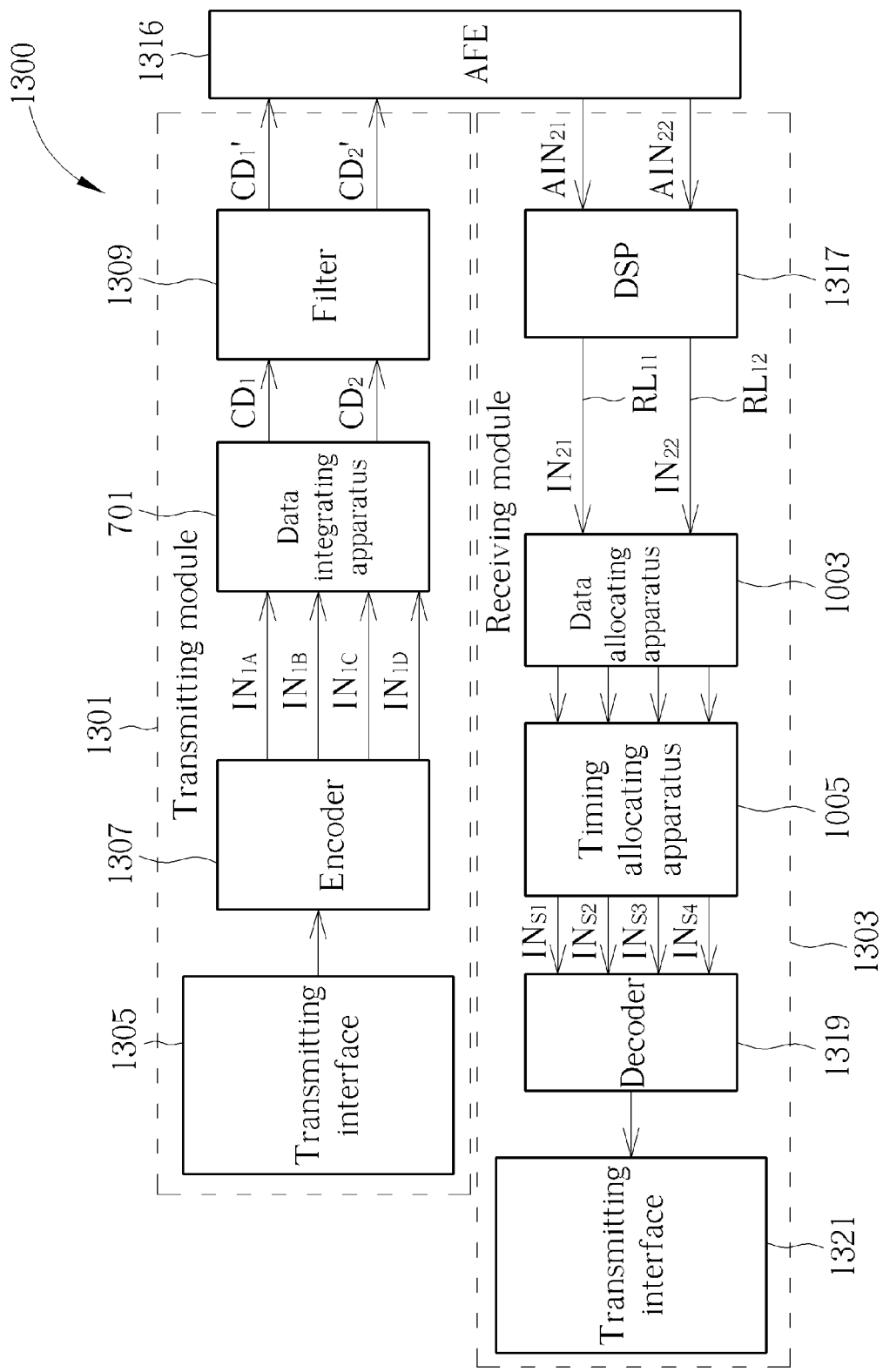
FIG. 13 is a block diagram illustrating an automotive network apparatus comprising the transmitting module in FIG. 7 and the receiving module in FIG. 10.

FIG. 13 is a block diagram illustrating an automotive network apparatus comprising the transmitting module in FIG. 7 and the receiving module in FIG. 10. Comparing with the automotive network apparatus 600 in FIG. 6, the automotive network apparatus 1300 also comprises the transmitting module 1301, the receiving module 1303 and the AFE 1316. The transmitting module 1301 also comprises the data integrating apparatus 701, the transmitting interface 1305, the encoder 1307 and the filter 1309. The difference 1301 between the transmitting module 1301 and the transmitting module 601 in FIG. 6 is that the data integrating apparatus 701 in the transmitting module 1301 outputs 2 integrated data streams $CD_1$, $CD_2$ but the data integrating apparatus 301 in the transmitting module 601 outputs 1 integrated data streams CD. In one embodiment, the transmitting interface 1305 in FIG. 13 is a GMII (gigabit media independent interface), which already meets Giga transmitting standard, thus the buffer 613 in FIG. 6 can be removed. However, please note the transmitting interface 1305 is not limited to be a GMII.

Comparing with the above-mentioned receiving module in FIG. 6, the receiving module 1303 also comprises a data allocating apparatus 1003, a digital signal processing apparatus 1317, a decoder 1319 and a transmitting interface 1321. The operations for the data allocating apparatus 1003, the digital signal processing apparatus 1317, and the decoder 1319 are already describe in the above-mentioned description, thus are omitted for brevity here. One different between the receiving module 1303 and the receiving module 603 in FIG. 6 is that the receiving module 1303 receives two second input data streams, but the receiving module 603 only receives one second input data stream. The receiving module 1303 can utilize a timing aligning apparatus 1005 to adjust the allocated data streams $IN_{S1}$, $IN_{S2}$, $IN_{S3}$, $IN_{S4}$ output from the data allocating apparatus 1003, as above-mentioned. The transmitting interface 1321 can be a GMII, the same as the transmitting interface 1305.

Please note although the combination for the automotive network apparatus with 1 pair of lines/transmitting mechanism for the automotive network apparatus with 4 pairs of lines, and the combination for the automotive network apparatus with 2 pairs of lines/transmitting mechanism for the automotive network apparatus with 4 pair lines are taken for example for explaining, it does not mean to limit the scope of the present invention. An automotive network apparatus with less pair of lines matches a transmitting mechanism for the automotive network apparatus with more pairs of lines all falls in the claim scope of the present invention. Therefore, a transmitting module according to the present invention can be summarized as: a transmitting module, comprising: M first transmitting lines, for respectively transmitting one of M first input data streams; a data integrating apparatus, for receiving the M first input data streams transmitted by the M first transmitting lines, and for integrating the M first input data streams to N integrated data streams, wherein M and N are positive integers and the M is larger than the N; and N second transmitting lines, for transmitting one of the N integrated data streams. Also, the receiving module shown in FIG. 4 can be summarized as below: A receiving module, comprising: a first receiving line, for receiving a second input data stream; a timing detecting apparatus, for detecting timings for a plurality of data units of the second input data stream; a data allocating apparatus, for allocating the second input data stream to X allocated data streams, wherein the X is a positive integer and the X is larger or equals to 2; and X second receiving lines, for respectively transmitting one of the X allocated data streams. Additionally, the receiving module shown in FIG. 10 can be summarized as below: A receiving module, comprising: X first receiving lines, for respectively receiving one of X second input data streams; a data allocating apparatus, for allocating the X second input data streams to Y allocated data streams, wherein the X and the Y are both positive integers, where the X is larger or equals to 2 and the Y is larger than the X; a timing aligning apparatus, for detecting timings for Y allocated data streams, thereby timings of the Y allocated data streams can align to each other; Y second receiving lines, for respectively transmitting one of the Y allocated data streams. Please note the transmitting module and the receiving module provided by the present invention can independently operate.

Figure 1:
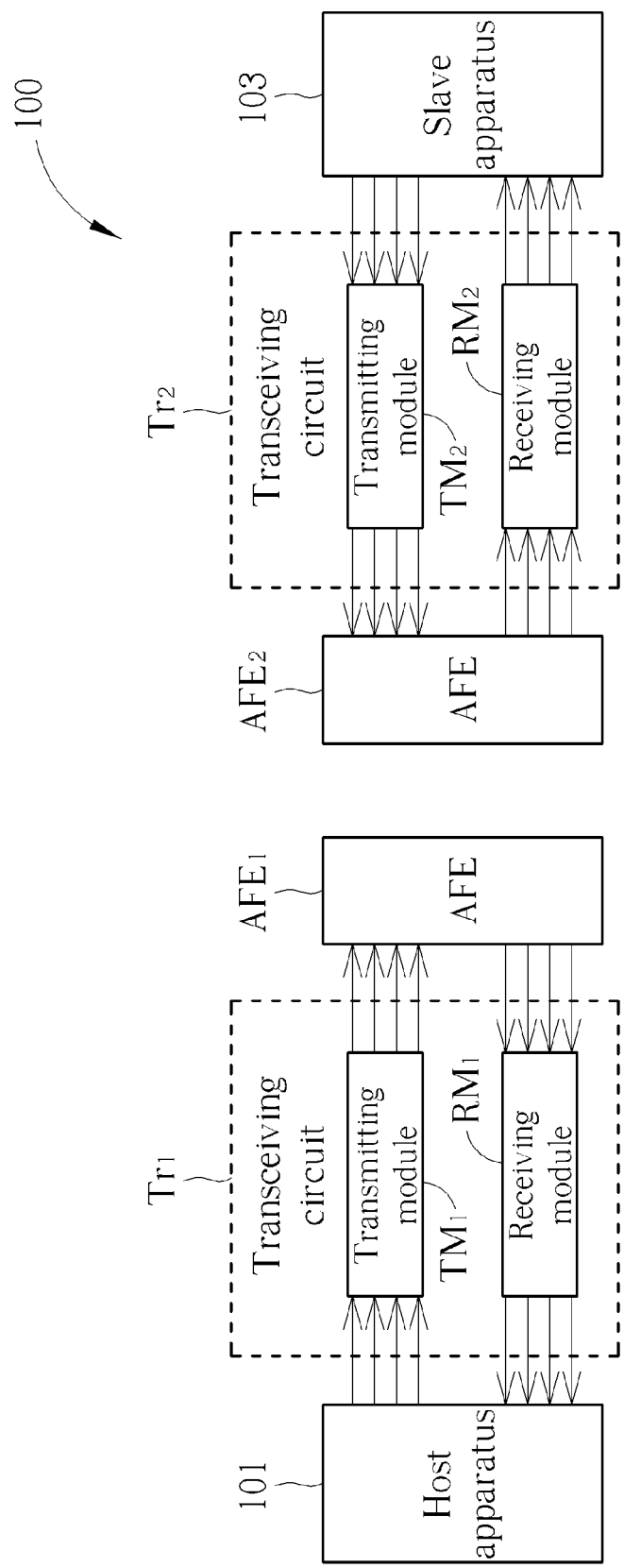
FIG. 1 is a schematic diagram illustrating a conventional automotive network apparatus.

In FIG. 1, it has already explained that an automotive network apparatus can be utilized between a host apparatus and a slave apparatus. Therefore, the integrated data stream (CD in FIG. 6) is transmitted to a slave apparatus and the first input data stream ($IN_1$ in FIG. 6) is from a host apparatus. In one embodiment, the automotive network apparatus comprises a control unit, such that the slave apparatus and the host apparatus can alternatively enter an activating state and a stop state. In the activating state, the host apparatus and the slave apparatus can transmit data, such that time periods for the activating states for the host apparatus and the slave apparatus should not overlap or the two apparatuses may disturb each other. Besides, the control unit further controls the host apparatus or the slave apparatus to stay in an adjusting state before entering the stop state, and controls impedance matching for the communicating apparatus in the adjusting state. By this way, the data transmitting for the communicating apparatus can be optimized.

Figure 14:
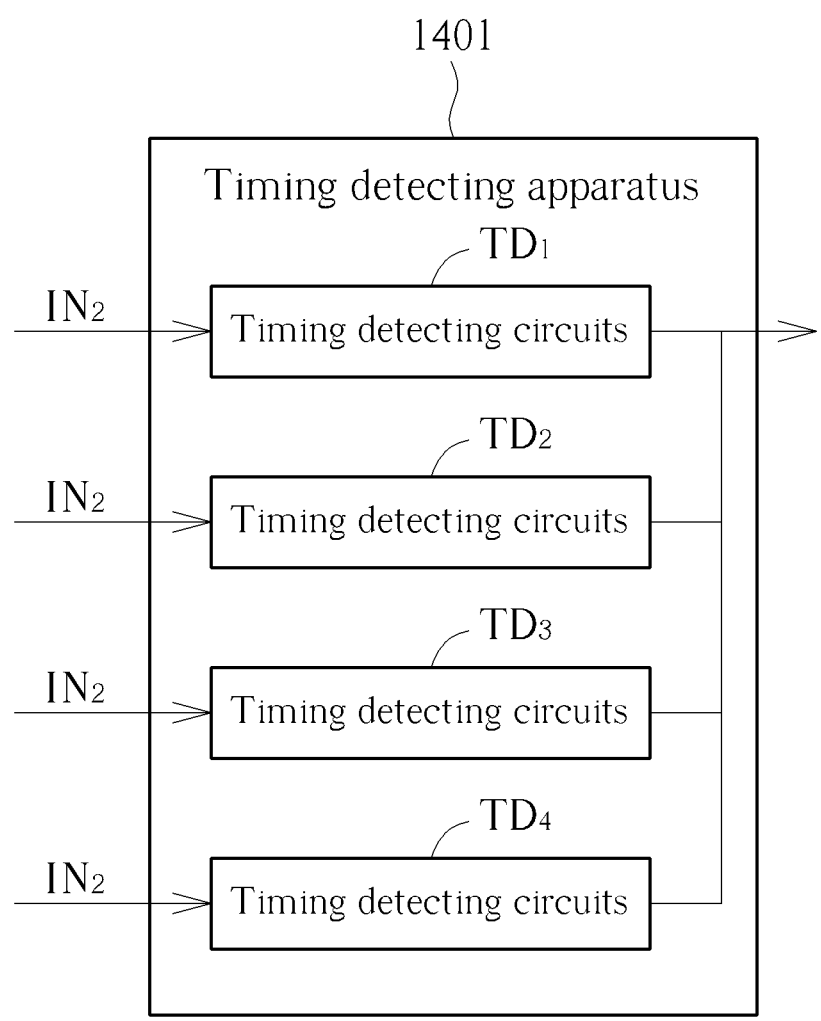
FIG. 14 is a block diagram illustrating a timing detecting apparatus according to another embodiment of the present invention.

The present invention further provides a mechanism to speed up the detecting for the timing detecting apparatus shown in FIG. 4 and FIG. 10. As shown in FIG. 14, the timing detecting apparatus 1401 comprises 4 timing detecting circuits $TD_1$, $TD_2$, $TD_3$ and $TD_4$. The timing detecting circuits $TD_1$, $TD_2$, $TD_3$ and $TD_4$ respectively uses different detecting standards to detect timings for the symbols of the second input data stream. Take FIG. 5 for example, the second input data stream $IN_2$ comprises symbols $A_1$, $B_1$, $C_1$, $D_1$, $A_2$, $B_2$, $C_2$, $D_2$. The timing detecting circuits $TD_1$ uses a first detecting standard to detect symbols $A_1$ and $A_2$ of the second input data stream $IN_2$, the timing detecting circuits $TD_2$ uses a second detecting standard to detect symbols $B_1$ and $B_2$ of the second input data stream $IN_2$, the timing detecting circuits $TD_3$ uses a third detecting standard to detect symbols $C_1$ and $C_2$ of the second input data stream $IN_2$, and the timing detecting circuits $TD_4$ uses a fourth detecting standard to detect symbols $D_1$ and $D_2$ of the second input data stream $IN_2$. By this way, the timing detecting apparatus 1401 can rapidly detect different symbols.

In view of above-mentioned embodiments, a communicating apparatus with less pairs of transmitting lines can match a transmitting mechanism for a communicating apparatus with more pairs of transmitting lines without greatly varying encoding/decoding algorithms. Also, a timing detecting apparatus that can rapidly detect symbol timings is also provided.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A receiving module, comprising:
   a first receiving line, for receiving a first input data stream;
   a timing detecting apparatus, for detecting timings for a plurality of data units of the first input data stream;
   a data allocating apparatus, for allocating the first input data stream to X allocated data streams, wherein the X is a positive integer and the X is larger than or equals to 2;
   X second receiving lines, for respectively transmitting one of the X allocated data streams;
   a decoder, for decoding the allocated data stream to generate a decoded allocated data stream; and
   a transmitting interface, for receiving and registering the decoded allocated data stream, wherein the transmitting interface outputs the decoded allocated data stream to the encoder if data amount for the decoded allocated data stream that is registered exceeds a predetermined data amount.

2. The receiving module of claim 1, wherein the X is 4.

3. The receiving module of claim 1, wherein the timing detecting apparatus comprises a plurality of timing detecting circuits respectively adopting different detecting standards to detect timings for the data units of the first input data stream.

4. The receiving module of claim 1, wherein the transmitting interface comprises:
   a buffer, for registering the decoded allocated data stream; and
   a medium dependent interface, for outputting the decoded allocated data stream that is registered.

5. The receiving module of claim 4, wherein the encoder follows a physical coding sublayer decoding code rule matching 1000 BASE-T standard.

6. A communicating apparatus, comprising:
   a transmitting module, comprising:
      M first transmitting lines, for respectively transmitting one of M first input data streams;
      a data integrating apparatus, for receiving the M first input data streams transmitted by the M first transmitting lines, and for integrating the M first input data streams to N integrated data streams, wherein M and N are positive integers and the M is larger than the N;

N second transmitting lines, for transmitting one of the N integrated data streams; and a control unit;

wherein the integrated data stream is transmitted to a slave apparatus and the first input data stream is from a host apparatus, where the control unit controls the host apparatus and the slave apparatus to alternatively enters an activating state and a stop state, wherein the control unit further controls the host apparatus or the slave apparatus to stay in an adjusting state before entering the stop state, and controls impedance matching for the communicating apparatus in the adjusting state.

7. A communicating apparatus, comprising:

a transmitting module, comprising:
  M first transmitting lines, for respectively transmitting one of M first input data streams;
  a data integrating apparatus, for receiving the M first input data streams transmitted by the M first transmitting lines, and for integrating the M first input data streams to N integrated data streams, wherein M and N are positive integers and the M is larger than the N;
  N second transmitting lines, for transmitting one of the N integrated data streams;

a receiving module, comprising:
  a first receiving line, for receiving a second input data stream;
  a timing detecting apparatus, for detecting timings for a plurality of data units of the second input data stream;
  a data allocating apparatus, for allocating the second input data stream to X allocated data streams, wherein the X is a positive integer and the X is larger or equals to 2;
  X second receiving lines, for respectively transmitting one of the X allocated data streams;

wherein the N is 1 and the receiving module further comprises:
  a decoder, for decoding the allocated data stream to generate a decoded allocated data stream; and
  a transmitting interface, for receiving and registering the decoded allocated data stream, wherein the transmitting interface outputs the decoded allocated data stream to the encoder if data amount for the decoded allocated data stream that is registered exceeds a predetermined data amount.

8. The communicating apparatus of claim 7, wherein the transmitting interface comprises:
  a buffer, for registering the decoded allocated data stream; and
  a medium dependent interface, for outputting the decoded allocated data stream that is registered.

9. The communicating apparatus of claim 7, wherein the encoder follows a physical coding sublayer decoding code rule matching 1000 BASE-T standard.

* * * * *